United States Patent [19]
Ulbricht, Jr.

[11] Patent Number: 4,490,610
[45] Date of Patent: Dec. 25, 1984

[54] TIME OF FLIGHT MASS SPECTROMETER

[75] Inventor: William H. Ulbricht, Jr., Arvada, Colo.

[73] Assignee: The United States of America as represented by the United States Department of Energy, Washington, D.C.

[21] Appl. No.: 414,745

[22] Filed: Sep. 3, 1982

[51] Int. Cl.$^{3}$ .............................................. B01D 59/44
[52] U.S. Cl. ..................................... 250/287; 250/288
[58] Field of Search ............... 250/306, 307, 281, 282, 250/283, 288, 287

[56] References Cited

U.S. PATENT DOCUMENTS

| | | | |
|---|---|---|---|
| 3,868,507 | 2/1975 | Panitz | 250/287 |
| 4,178,507 | 12/1979 | Brummée et al. | 250/288 |
| 4,296,322 | 10/1981 | Wechsung | 250/287 |

OTHER PUBLICATIONS

"A Measurement Method of TOF of Charged Particles", Andrade et al., *Nucl. Inst. and Methods,* 121, No. 2, 1974, pp. 359-363, 250-287.
"Californium-252 Plasma Desorption Mass Spectroscopy", Macfarlane et al., *Science,* vol. 191, pp. 920-925, Mar. 1976.
"252 CF-Plasma Desorption TOF Mass Spect.", Macfarlane et al., *International Jour. of Mass Spectrometry and Ion Physics,* vol. 21, pp. 81-92, 1976.

*Primary Examiner*—Bruce C. Anderson
*Attorney, Agent, or Firm*—James W. Weinberger; Sandra B. Weiss

[57] ABSTRACT

A time-of-flight mass spectrometer is described in which ions are desorbed from a sample by nuclear fission fragments, such that desorption occurs at the surface of the sample impinged upon by the fission fragments. This configuration allows for the sample to be of any thickness, and eliminates the need for complicated sample preparation.

5 Claims, 3 Drawing Figures

TIME OF FLIGHT MASS SPECTROMETER

CONTRACTUAL ORIGIN OF THE INVENTION

The United States Government has rights in this invention pursuant to employment of the Applicant by the U.S. Department of Energy.

BACKGROUND OF THE INVENTION

This invention relates to a fission-fragment induced desorption time-of-flight mass spectrometer. More particularly, this invention relates to a fission-fragment induced desorption time-of-flight mass spectrometer wherein sample ions are desorbed from the same surface of the sample impinged upon by desorption-inducing fission fragments.

Mass spectrometry is an analytical technique for determining the chemical and isotopic composition of a sample of interest. In a typical mass spectrometer, a small quantity of the sample is ionized into molecular ions and quasimolecular ion fragments which are volatilized. The masses of these volatilized ions and ion fragments are then determined, and from this information the chemical and isotopic composition of the original sample may be deduced.

One method for determining ionic masses is known as time-of-flight mass spectrometry (TOFMS). By this method sample ions of different masses but having the same kinetic energy travel the length of a flight region which is free of any electrical or magnetic fields. Ions with different masses travel the length of the flight region with different velocities such that lighter ions traverse the flight region faster than heavier ions. Detectors at each end of the flight region signal the precise start time and arrival time of each ion. The mass of each ion may then be determined from the time required for the ion to traverse the length of the flight region and the known kinetic energy. A mass spectrum is developed by compiling the flight times of many desorbed ions and analyzing the data by computer.

It is desirable to ionize and volatilize the sample with minimal fragmentation of the sample molecules so that the ionic masses determined will correspond as closely as possible to the masses of the original sample molecules. This may be accomplished by means of desorption. Desorption is a process whereby a highly energetic particle strikes a solid sample, transferring a large quantity of energy to a very localized area of the sample and causing ejection of minute amounts of the sample from the surface of the localized area. In fission fragment induced desorption (FFID), the high energy particles are nuclear fission fragments. Although desorption is a very localized and highly energetic process with temperatures estimated to reach as high as 66,000° K., the desorption occurs so quickly that energy is not transferred to the vibrational modes of the desorbed molecules. As a result, many chemical bonds that would normally break at such high temperatures remain intact during desorption, and fragmentation of the desorbed sample molecules is minimized.

Desorption-inducing nuclear fission fragments may be emitted from a radioactive source such as $^{252}$Cf. The $^{252}$Cf nucleus fissions spontaneously into two fission fragments which travel in almost exactly opposite directions. Thus each fission fragment which strikes a sample to induce desorption has a complementary fragment which can be detected and used as a time zero marker. By continuing to expose the sample to the fission fragment source, desorption is automatically repeated many times per second, depending on the strengh of the $^{252}$Cf source.

Fission fragment induced desorption TOFMS is a useful and versatile technique, but it has heretofore been subject to limitations, particularly with respect to the types of samples that can be analyzed and preferred methods of sample preparation. These limitations occur in part because of the configuration in the mass spectrometer of the fission fragment source, sample, and flight region. In prior art devices, these components have been in a linear configuration with the sample between the source and the flight region. In these spectrometers the sample is a thin film supported upon a metal foil, with the metal foil facing the source and the exposed sample facing the flight region. In this arrangement a fission fragment emitted from the radioactive source must penetrate the metal foil and the sample and exit the opposite face of the sample to induce desorption of sample particles from the opposite face, whereupon the desorbed sample particles pass into the flight region. This configuration has been used to maximize the number of fission fragments which strike the sample. It may be seen that in this arrangement the sensitivity of the device is dependent on the thinness and uniformity of the sample and hence of the method of sample preparation. Since fission fragment induced desorption is a surface phenomenon, the desorption yield is proportional to the area of foil surface actually covered by sample molecules. Samples are typically deposited by solvent evaporation to produce a thin film on the metal foil. This produces non-uniform samples and up to 100 $\mu g/cm^2$ must be deposited to adequately cover the surface. Electrospray techniques allow the deposition of more uniform samples. Nevertheless, not all samples of interest are amenable to dissolution and thin-film depostion by these techniques. For example, it is extremely difficult to prepare samples of insoluble metal oxides for isotopic analysis by these methods.

Fission fragment induced desorption TOFMS is described by R. D. Macfarlane and D. F. Torgerson in *Science*, Vol. 191, Mar. 5, 1976, pp 920–925, and by the same authors in *International Journal of Mass Spectrometry and Ion Physics*, Vol. 21, 1976, pp 81–92, Elsevier Scientific Publishing Company. These references describe the application of the technique to biologically important molecules. In both of these references the spectrometer is constructed so that the desorption-inducing $^{252}$Cf fission fragment must penetrate the supporting metal foil and the entire thickness of the sample. Heretofore all fission fragment induced desorption TOFMS instruments have had this limitation.

SUMMARY OF THE INVENTION

It is thus one object of the invention to provide a fission fragment induced desorption time-of-flight mass spectrometer (FFID-TOFMS).

It is another object of the invention to provide a FFID-TOFMS in which the sample may be of any thickness.

It is yet another object of the invention to provide a FFID-TOFMS in which sample ions are desorbed from the surface of the sample impinged upon by the desorption-inducing particles.

It is still another object of the invention to provide a FFID-TOFMS suitable for analysis of insoluble samples.

Additional objects, advantages, and novel features of the invention will be set forth in part in the following description.

In accordance with the invention, a FFID-TOFMS is provided in which the sample, fission-fragment source, and flight region are arranged in a non-linear configuration. More particularly, the components are arranged so that the sample ions which enter the flight region are desorbed from the surface of the sample facing the fission fragment source. Since the fission fragment then does not have to penetrate an entire sample thickness and supporting foil, the sample may be of any thickness desired. This allows great variation in the types of samples analyzed and the sample preparation techniques employed.

DETAILED DESCRIPTION OF THE PREFERRED EMBODIMENT

The following is a brief description of a preferred embodiment; other embodiments will be readily apparent to those skilled in the art.

Figure 1:
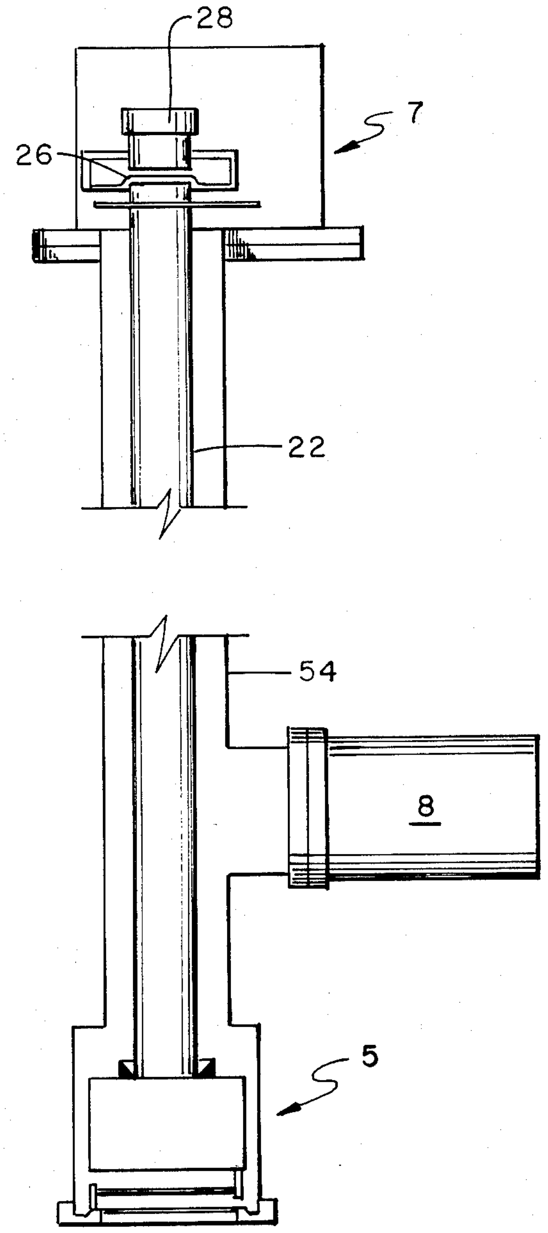
FIG. 1 illustrates the main components of the inventive device.
Figure 2:
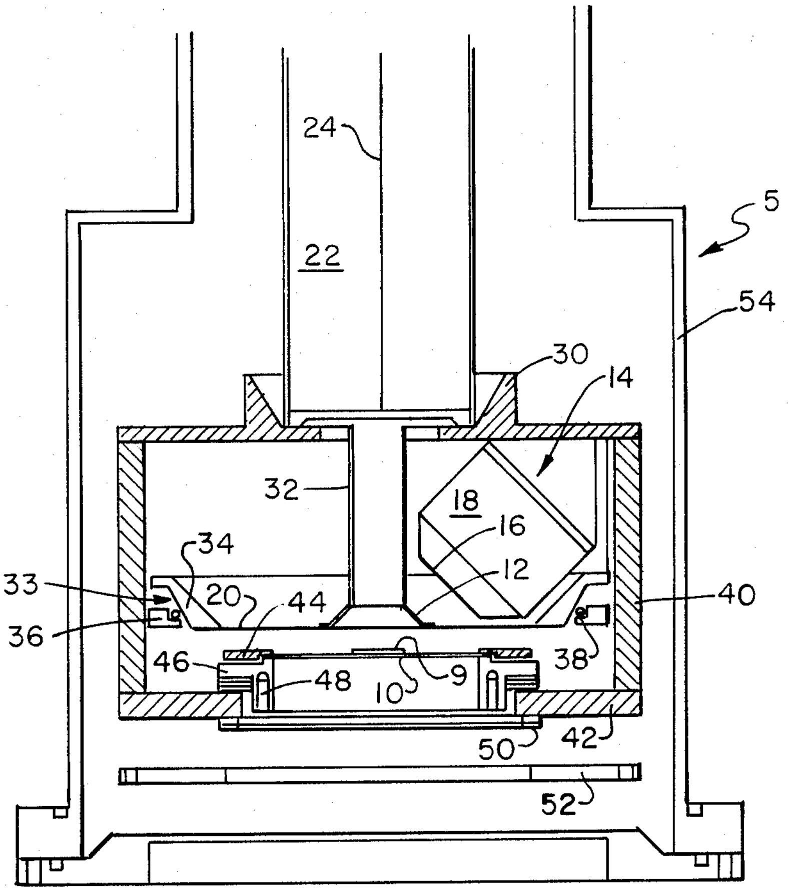
FIG. 2. is a cross-sectional view of the sample-ionizer assembly of the device.

The invention is most readily understood by reference to FIGS. 1 and 2, which illustrate the main components of the fission fragment induced desorption time-of-flight mass spectrometer (FFID-TOFMS).

As shown in FIG. 1, outer housing 54 encloses sample-ionizer assembly 5, flight tube 22, and ion detector assembly 7. Assemblies 5 and 7 are positioned at opposite ends of flight tube 22. The system is evacuated by means of pump 8, which may be an ion pump or preferably a turbomolecular pump. Pump 8 is preferably placed nearer sample-ionizer assembly 5 than ion detector assembly 7.

FIG. 2 is a detailed illustration of sample-ionizer assembly 5. It may be seen that the solid sample of interest 9 is supported on sample plate 10 which can be made of any inexpensive readily available material such as 1/32-inch stainless steel. The sample 9 can be mounted on sample plate 10 by any convenient method. For example, a metal oxide powder may be mounted on plate 10 by means of a simple adhesive. An accelerating voltage of 5,000–10,000 V is applied to sample plate 10.

Desorption of sample molecules is induced by nuclear fission fragments emitted from fission fragment source 12. Source 12 is preferably 25 uCi of $^{252}$Cf sandwiched between two nickel foils. Radioactive sources of this type are commercially available. When a nucleus of $^{252}$Cf spontaneously fissions, it emits from source 12 two fission fragments which travel in almost exactly opposite directions. One fragment will strike particle detector 14, which comprises electron emitting foil 16 and microchannel plate array 18. When a fission fragment from source 12 strikes foil 16, approximately 50–70 electrons are released into microchannel plate array 18 which results in a large, fast pulse to mark time zero. The other fission fragment passes through grounded grid 20 which is 100 mesh 82% transmission Ni. The fragment strikes the sample on plate 10, causing desorption of sample molecules as ions. The source 12, particle detector 14, and sample plate 10 are positioned at carefully measured distances from one another so that sample desorption occurs at very near the same moment that particle detector 14 marks time zero.

The desorbed ions are accelerated through grounded grid 20 by the high voltage applied to sample plate 10 so that all the ions that have passed through grounded grid 20 have the same kinetic energy. These ions then pass into flight tube 22. Flight tube 22 is stainless steel and 1.5 m long. Tube 22 is evacuated to a pressure of about $10^{-6}$ torr. A 0.025 mm stainless steel guide wire 24 is mounted on the axis of tube 22 and extends its full length. A potential of about 20 V is applied to guide wire 24, so that as the ions travel the length of flight tube 22 they travel upward in a helical path about guide wire 24. This reduces the number of sample ions that would be lost due to collisions with the walls of tube 22. When the sample ions reach the opposite end of flight tube 22, they pass through second grounded grid 26 and strike ion detector 28. These features are shown schematically in FIGS. 1 and 3. Detector 28 is preferably an array of microchannel plates similar to that used in detector 14. The detector signals the precise arrival time of each ion. Then the mass of each ion may be determined from the relation $M=2E(t/s)^2$, where M is the ionic mass, E is the kinetic energy which is the potential applied to sample plate 10, t is the time of flight, and s is the length of the flight path. For each ion that strikes detector 28 the time of flight is retained in a multichannel analyzer 78 until enough data has been collected to compile a reliable mass spectrum for the sample.

It may be seen that several advantages are attained with the instant invention. Because the desorption-inducing fission fragment does not have to pass through the entire sample thickness in order to desorb sample ions into the flight tube, the sample may be of any thickness. This increases the probability that a fission fragment will desorb molecules of interest from the sample. It also allows analyses to be performed on insoluble solids such as inorganic oxide powders, instead of only on thin film samples. Finally, the analyst need not engage in difficult and time-consuming sample dissolution and deposition procedures. These advantages are readily apparent from the following example.

EXAMPLE

The sample plate was washed and dried. The plate was covered with a paper mask with a 0.5 inch diameter hole in the center, and a thin coat of vacuum adhesive was sprayed onto the plate through the mask. The mask was removed and a small amount of finely powdered $U_3O_8$ sample was pressed into the sticky adhesive. Loose sample was removed by tapping the plate on its side. The sample was baked in a drying oven at 150° C. for about 4 hours to drive the volatile solvent from the adhesive.

The sample was fitted into the instrument. The flight tube was evacuated to a pressure of $10^{-6}$ torr. A potential of of +10,000 V was applied to the sample plate. Potentials of about +1,400 V were applied to both the fission fragment detector and the ion detector. Data were collected for about 1 hr. In a determination of the atom percent of $^{235}$U in the sample, peaks were seen at mass 267 ($^{235}UO_2^+$) and 270 ($^{238}UO_2^+$). No peaks were seen at mass 235 ($^{235}U^+$) or 238 ($^{238}U^+$), indicating the gentleness of the desorption process. Six samples were analyzed in this manner. Results obtained with the fission fragment TOFMS and with a standard magnetic mass spectrometer using thermal ionization are compared in the following Table.

TABLE

| | Atom Percent $^{235}U$ | | |
|---|---|---|---|
| Sample Number | FFID-TOFMS | Magnetic Mass Spec. | Data Aquisition Time (hrs) |
| 1 | 0.0% | 0.721% | 1.0 |
| 2 | 16.3% | 18.632% | 1.0 |
| 3 | 8.5% | 13.153% | 1.0 |
| 4 | 79.5% | 75.570% | 3.2 |
| 5 | 96.3% | 93.182% | 1.0 |
| 6 | 54.9% | 52.658% | 0.5 |

It may be seen that the results obtained with the instant invention are reasonable when compared with the results obtained with a conventional mass spectrometer.

The inventive device has been designed for ease of assembly and to facilitate changing sample plate 10. Flight tube 22 rests on base plate 30 which also supports source holder 32. Grounded grid 20 is supported by a unique grid-stretching system 33 in which the grid is stretched across grid-stretcher base 34 by means of press ring 36, with O-ring 38 forming a seal between base 34 and ring 36. This system holds the grid tightly yet facilitates its removal from the system. Base plate 30 is supported by standoff 40 which rests on ceramic insulator plate 42.

Sample plate 10 is supported between sample press plate 44 and sample base plate 46. Sample base plate 46 is provided with openings 48 for high voltage electrical connectors. Shim plates 50 allows for small adjustments of the position of sample plate 10 relative to grid 20. The entire sample-ionizer assembly may be positioned relative to flight tube 22 by means of spring-loaded support plate 52. The instrument is enclosed in outer housing 54. During operation a vacuum is maintained throughout the entire system including sample-ionizer assembly 5, flight tube 22 and ion detector assembly 7. To change a sample, the device is opened to the atmosphere and the entire assembly exclusive of flight tube 22 is removed from outer housing 54 as a single unit. Components 30, 32, 33 and 14 are then removed from the assembly as a unit to expose sample plate 10. Press plate 44 is removed, the used sample plate is replaced with a new sample plate 10, press plate 44 is replaced, and the entire assembly is easily reassembled and replaced in outer housing 54. The system may be evacuated very rapidly by means of turbomolecular pump 8, and data acquisition may begin in about 10 minutes.

Figure 3:
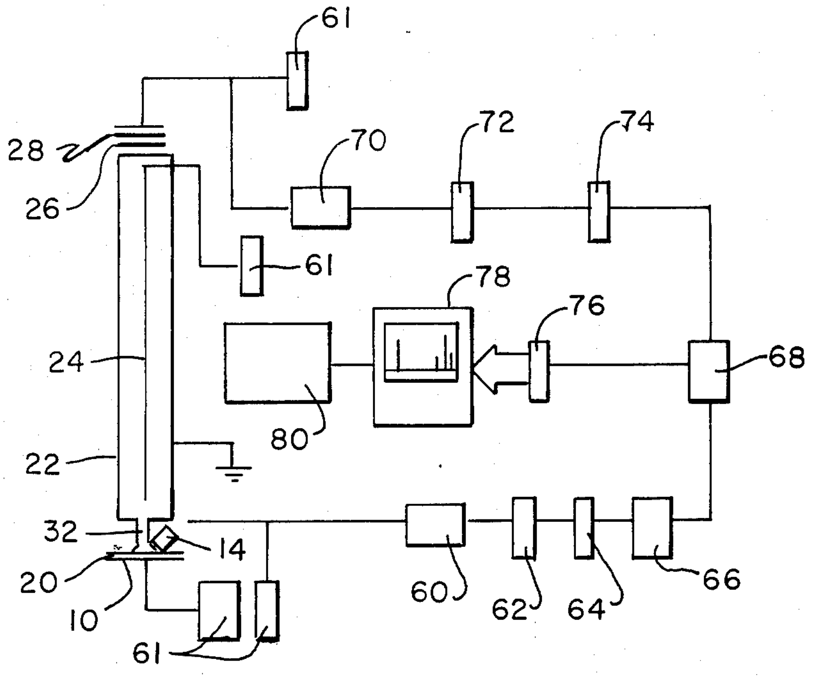
FIG. 3 is a schematic diagram of the electronic circuitry used in the inventive device.

The electronic system used in the mass spectrometer is illustrated schematically in FIG. 3. The system is powered by high voltage power supplies 61. When a $^{252}Cf$ nucleus fissions, one of the fragments will be detected by fission fragment detector 14. Detector 14 sends a signal through preamplifier 60, amplifier 62, discriminator 64 and variable time delay 66 to time-to-amplitude converter 68. The signal is a start signal for time-to-amplitude converter 68. All this occurs in a few nanoseconds. The other $^{252}Cf$ fission fragment will strike the sample on sample plate 10 and induce desorption and ionization. The desorbed ions pass through grounded grid 20, traverse the length of flight tube 22 in approximately 15 $\mu s$, pass through second grounded grid 26 and strike detector 28. Detector 28 sends a signal by means of preamplifier 70, amplifier 72 and discriminator 74 to time-to-amplitude converter 68. This signal is the stop signal for converter 68. Converter 68 then emits a pulse, the amplitude of which corresponds precisely to the elapsed time between the start signal and the stop signal. The pulse is transmitted from time-to-amplitude converter 68 to analog-to-digital converter 76, and the digitized information is transmitted to multichannel analyzer 78. Each converted time signal corresponds to the mass of the ion detected. Multichannel analyzer 78 has several memory locations, each corresponding to an ion of a particular mass. When time-to-amplitude converter 68 sends a signal corresponding to a particular mass to multichannel analyzer 78, multichannel analyzer 78 increments the channel corresponding to that mass. In this way, multichannel analyzer 78 gathers the data in the form of a mass spectrum. The data may then be stored in on-line microcomputer 80. Since the electronics have a response time on the order of nanoseconds and the time of flight of a typical sample ion is on the order of microseconds, it may be seen that the electronics add a negligible time error to the data acquisition.

From the foregoing description it may be seen that, although each fission fragment striking the sample can desorb several ions, only the ion which first reaches detector 28 will be detected. This would result in a bias in favor of lighter ions. This problem may be avoided by use of variable time delay 66. This device may be used to delay the transmission of the start signal to time-to-amplitude converter 68 until after the lighter ions have passed detector 28. Then the start signal may be transmitted just before the ion of interest strikes detector 28 and transmits the stop signal. The delayed time span may then be added to the elapsed time measured by time-to-amplitude converter 68 to get a true measurement of the time-of-flight of the detected ion. In this way, the analyst may select a mass region of interest to study.

It may be seen that many variations of the inventive device are possible. For example, a variety of different samples may be used; also, liquid samples may be maintained in a frozen state on a sample plate by cooling means situated below the plate while the sample is being analyzed. Other uses and variations will be apparent to one skilled in the art. The embodiment was chosen and described in order to best explain the principles of the invention and its practical application.

The embodiments of the invention in which an exclusive property or privilege is claimed are defined as follows:

1. A time-of-flight mass spectrometer for obtaining a mass spectrum of a sample of interest in the said state, said sample having at least one surface comprising:
   - a means for supporting the sample to be analyzed,
   - a quantity of fissile material positioned relative to said supporting means, said material being such that when a nucleus of the material undergoes fission it will be split into two fragments, a first fragment which will be emitted from said source to impinge upon a surface of said sample and desorb ions from said surface and a second fragment which will be emitted in about the opposite direction,
   - a flight region positioned to receive said desorbed ions,
   - means for accelerating said desorbed ions away from said sample surface and into said flight region,
   - means for detecting said second fission fragment emitted from said fissile material at about the same moment that ions are desorbed from said sample surface, said means generating a first electrical signal when said second fission fragment is detected, means for detecting said desorbed ions, said means positioned at the end of said flight region opposite said sample, said means generating a second electrical signal when a desorbed ion is detected, and means for measuring the time elapsed between said first electrical signal and said second electrical signal, said time being determinative of the mass of each desorbed ion respectively.

2. The mass spectrometer of claim 1 wherein said means for detecting said second fission fragment is positioned on the same side of said sample surface as the means for detecting said desorbed ions.

3. The mass spectrometer of claim 2 wherein said particle-emitting source contains a quantity of $^{252}Cf$.

4. The mass spectrometer of claim 3 wherein said sample is a powder.

5. A mass spectrometer of claim 4 wherein said sample is a powder retained on said supporting means by means of an adhesive.

* * * * *